(12) United States Patent
Stover (10) Patent No.: US 7,587,858 B2
(45) Date of Patent: Sep. 15, 2009

(54) METHOD AND APPARATUS FOR CULTIVATION OF SUBAQUATIC VEGETATION

(75) Inventor: James D. Stover, Gloucester Point, VA (US)

(73) Assignee: Roy E. Hock, Williamsburg, VA (US)

( * ) Notice: Subject to any disclaimer, the term of this patent is extended or adjusted under 35 U.S.C. 154(b) by 296 days.

(21) Appl. No.: 11/201,539

(22) Filed: Aug. 11, 2005

(65) Prior Publication Data

US 2007/0062112 A1   Mar. 22, 2007

(51) Int. Cl.
A01C 7/00 (2006.01)
(52) U.S. Cl. .................................................. 47/58.1 R
(58) Field of Classification Search .................. 441/43; 47/1.01 R, 59 R, 58.1
See application file for complete search history.

(56) References Cited

U.S. PATENT DOCUMENTS

| | | | |
|---|---|---|---|
| 681,884 A * | 9/1901 | Monjeau | 210/602 |
| 3,250,606 A | 5/1966 | Murray | |
| 3,468,057 A | 9/1969 | Ruisson et al. | |
| 3,959,923 A | 6/1976 | Selke | |
| 4,118,891 A | 10/1978 | Kehl et al. | |
| 4,137,868 A | 2/1979 | Pryor | |
| 4,324,069 A | 4/1982 | Flagg | |
| 4,487,588 A * | 12/1984 | Lewis et al. | 441/43 |
| 5,001,859 A | 3/1991 | Sprung | |
| 5,121,708 A | 6/1992 | Nuttle | |
| 5,322,035 A | 6/1994 | Hawes et al. | |
| 5,598,663 A | 2/1997 | Kikuchi | |
| 5,618,413 A * | 4/1997 | Todd et al. | 210/151 |
| 5,993,649 A * | 11/1999 | DeBusk et al. | 210/97 |
| 6,387,265 B1 | 5/2002 | Hosoya | |
| 6,973,752 B2 * | 12/2005 | Anderson | 47/58.1 R |
| 2002/0038785 A1 | 4/2002 | Hosoya | |
| 2002/0155595 A1 | 10/2002 | Adelberg et al. | |

FOREIGN PATENT DOCUMENTS

| | | |
|---|---|---|
| GB | 2268929 | 1/1994 |
| JP | 63309121 | 12/1988 |
| JP | 556726 | 3/1993 |
| JP | 7213189 | 12/1995 |
| JP | 9248091 | 9/1997 |
| JP | 1042626 | 2/1998 |
| JP | 2001120107 | 5/2001 |
| JP | 2003339289 | 12/2003 |
| JP | 2004187519 | 7/2004 |

(Continued)

OTHER PUBLICATIONS

Borde et al.; Eelgrass in Captivity: Population Dynamics in a Confined System; 2001; Applicant's IDS.*

(Continued)

Primary Examiner—Francis T Palo
(74) Attorney, Agent, or Firm—Thomas, Raring & Teague, P.C.

(57) ABSTRACT

A method and apparatus are used for the cultivation of subaquatic vegetation. The apparatus and method seek to mimic the actual ecosystem of subaquatic vegetation that is being grown. Because the vegetation that is grown is raised in natural conditions, it will have a better chance for survival upon ultimate transplantation in a river, bay or other natural ecosystem.

10 Claims, 5 Drawing Sheets

FOREIGN PATENT DOCUMENTS

JP          2008061568 A  *  3/2008

OTHER PUBLICATIONS

Borde et al., Eelgrass in Captivity:Population Dynamics in a Confined System; 2001; Applicant's IDS.*

Ammy B. Borde, Ronald M. Thom, and Eve Fagergre; Eelgrass in Captivity: Population Dynamics in a Confined System.

J. Emmett Duffy, Annie M. Harvilicz; Marine Ecology Progress Series; vol. 223:201-211; Published Nov. 28, 2001.

* cited by examiner

METHOD AND APPARATUS FOR CULTIVATION OF SUBAQUATIC VEGETATION

The present invention relates to a method and apparatus to successfully cultivate and produce subaquatic vegetation under nursery conditions. The invention includes use of directionally flowing water and grazing invertebrate organisms in an effort to mimic the natural conditions of a subaquatic ecosystem.

BACKGROUND

Marshlands and tidal ecosystems are under threat worldwide from population expansion and waterfront development. The threat to these ecosystems includes threats to the plant life that is an important component in the overall biological system. One particular class of plant life that is under threat is subaquatic vegetation. Subaquatic vegetation includes specific plants such as Zostera Marina (eel grass) that are a basic component in the sustenance of a successful tidal ecosystem.

As the quantity and quality of eel grass beds has declined, there have developed stringent governmental requirements with respect to moving and/or replacing eel grass beds during construction and other development and restoration activities. The demand for these plant products, therefore, is very high. At present, it is typically necessary to take live plants from existing beds and replant them where needed. Unfortunately, there are no commercially known methods beyond an actual, natural habitat for successfully growing eel grass that can be transplanted.

Eel grass is similar to other subaquatic vegetation in that it is often unable to be grown in conditions other than the natural environment. Apparently, these plants are adapted to grow only in the conditions where they are found. If attempted to grow these plants in still water, then excess algae and water fouling may occur. Even if it is possible to have some measure of success in growing these types of plants in a still water tank, then the transplanted vegetation is at risk, as a result of the natural conditions being significantly different from the growing conditions.

SUMMARY

Accordingly, it is an object of the present invention to overcome the foregoing limitations with existing nursery conditions. The present invention is directed to a cultivation system suitable for a nursery setting that is designed to mimic the natural conditions of growth of subaquatic vegetation including, for instance, eel grass plants. The elements of the present apparatus include one or more of a directionally flowing water system, the use of natural bioorganisms, and filtration and monitoring of water chemistry. These elements, used alone and in combination, are effective in successfully growing subaquatic vegetation in a location other than the natural habitat where the vegetation grows.

In one example, an apparatus for production of subaquatic vegetation comprises a containment structure comprising a bottom wall and side walls that are connected together to form a substantially water tight trough. A directional water flow system is mounted on the containment structure and comprises a water feeder pipe and a water drain pipe wherein the feeder pipe supplies water into the containment structure and the drain pipe draws water from inside the containment structure. Water is placed inside the containment structure and has a water level. A vegetation growth substrate is placed inside the containment structure and under the water level. Natural bioorganisms are placed inside the containment structure, and a water filtration system is connected to the directional water flow system between and connecting the drain pipe and feeder pipe. The containment structure may comprise a pair of sidewalls and a pair of end walls and the side walls may be longer than the end walls so that the containment structure has the shape of a rectangular trough. The natural bioorganisms may comprise grazing invertebrates including amphipods. The water filtration system may comprise a plurality of biofiltration components. The water feeder pipes may further comprise bottom substrate flow through pipes that are mounted inside the containment structure and under the top level of the vegetation growth substrate.

In another example, a method of producing subaquatic vegetation comprises the steps of providing a containment structure comprising a bottom wall and side walls that are connected together to form a substantially water tight trough. The method also includes providing a directional water flow system mounted on the containment structure. The method further includes providing water inside the containment structure and vegetation growth substrate in the containment structure and below the water level. Additionally, natural bioorganisms are placed inside the containment structure. A directional flow of water is created across the growth substrate in the containment structure and the water that is provided to the containment structure is filtered.

DETAILED DESCRIPTION

The present invention is a system that mimics the actual ecosystem of subaquatic vegetation that is being grown. The present system mimics a natural ecosystem in one or more of the following ways: creating a directional flow of water over the vegetation, providing natural bioorganisms in the system, and filtering and monitoring the water that is used in the system. A benefit of the use of the method and apparatus described herein is that the vegetation that is grown is raised in natural conditions and will have a better chance for survival upon transplantation.

The system includes a trough or other platform in which the system is contained. It is preferably fabricated above ground for ease of planting and harvesting, although it could also be an in-ground or on-ground apparatus. For economies of scale and ease of service and handling, a long and narrow trough can be desirable. However, the trough could be essentially any shape that could be built. In one example, the trough is a narrow rectangle that allows a person to have access to all of the plants that would be growing in the trough. The depth of the trough is limited only by the parameters of the system that preferably include the vegetation substrate, the water, and the subaquatic vegetation that will be growing in the substrate. A depth of about two or more feet is capable of growing many types of long-leaf vegetation. If the vegetation is very short or low-lying, a more shallow trough could be used. The trough should be substantially watertight, because the purpose is to grow subaquatic vegetation. The trough may be lined or otherwise sealed to prevent or minimize leakage in use. It may further be insulated for heating and cooling purposes.

The water that is used with the present system is intended to mimic the water found in the targeted transplant location. For instance, fresh water vegetation would use fresh water in the system. Salt water may be used in connection with different coastal and tidal plants. The specific degree of salinity of a given water composition may varied depending on local conditions. Also, the water temperature may be modified and varied, if necessary, to match or otherwise be similar to the water temperature of the transplant location. For instance, for vegetation that will be eventually planted in a generally northern location, it is possible to grow that vegetation in a southern location by providing some cooling of the water. The reverse if true where a system that is built in a northerly location may include heated water when the eventual vegetation is intended to be planted in a location with warmer climates. The depth of the water in a trough may be varied to mimic the eventual condition of the transplantation site or based on the species being grown. Still further, the water level may be designed to raise and lower, for instance in simulation of a tidal condition. This raising and lowering of the depth may be accomplished through use of a storage/overflow tank where the excess water may be pumped into and held when the water level is lowered. Similarly, water can be pumped from a tank into the system when the water level is raised.

The water may be taken from bays or rivers, but that water should be sterilized to kill any unwanted organisms. Alternatively, fresh water may be obtained from a well or municipal system. In order to obtain a particular salt water mix, the fresh water may be mixed with commercially available sea salt products available, for instance, under the brand names Red Sea, Crystal Sea, or Pro Line. In the case of eel grass, it is believed that plants that are raised in water of lower salinity than that where it will be planted may detrimentally affect the eel grass. Therefore, the salinity of the water in which eel grass is raised should be at least about as high or higher than where it will be ultimately planted. In the example of eel grass, the approximate salinity may be from about 8 to 30 parts per thousand. A salinity meter is used to set and monitor the salinity level. The salinity level should be checked approximately every three days unless a heavy rain over the system would require more frequent testing. Other water chemistry that is monitored includes PH, dissolved oxygen, total dissolved solids, total suspended solids, temperature, ammonia, carbon dioxide, chlorides, hardness and nitrates. This chemistry is adjusted to best reproduce the natural environment. Each of these chemical attributes may be modified, or may need to be modified during the process. Additional chemicals may need to be added to make the overall system balanced.

A directional water flow system can be adapted for use with specific conditions. For instance, a water feeder pipe or pipes may be used to create a horizontal water flow above the level of the vegetation substrate in a particular direction. The water flow may be bidirectional as in the imitation of tidal conditions. Alternatively, the water flow could be unidirectional, for instance, in the case of vegetation to be planted in a river location. The horizontal water flow may be created by one or more nozzles that are part of the water feeder pipe system. The nozzles spray jets of water to cause a flow or current of water in a trough. Typically, at least a pair of nozzles is used to create a clockwise or counterclockwise flow. The nozzles may preferably be swivelled to also create reverse flow or current. Therefore, bidirectional or multidirectional flow may be achieved by simply adjusting the water spray nozzles.

Another aspect of directional water flow includes vertical water flow through the body of the vegetation substrate itself. Perforated pipes or other feeder tubes can be mounted in the bottom of the trough under/within the substrate to create flow upwardly through the substrate. This flow through the sand or organic composition imitates tidal conditions and/or wave action. Most advantageously, the filtration system of the present system may be connected to the directional water flow system so that the water may be filtered after it is drained out of the trough and before it is pumped back into it.

The substrate used in the planting pots in connection with the present system is intended to imitate the transplant conditions. For instance, different locations will have relatively more sandy versus muddy composition. The vegetation substrate selected to grow the subaquatic vegetation may be similar to the eventual transplantation site. The vegetation substrate itself can be harvested from an actual location at or near the location of the target planting site. Alternatively, the substrate can be mixed to artificially create the substrate composition.

In order to accurately imitate the growing conditions in, for instance, tidal wetlands, recognition of the microscopic level of the ecosystem allows for a more healthy and survivable crop of that vegetation. Natural bioorganisms are incorporated into the system for the benefit of the subaquatic vegetation. For purposes of this invention, "natural bioorganisms" shall include microorganisms and/or macroorganisms. The microorganisms include, for instance, a wide range of bacteria and other cellular organisms. The particular species that are appropriate for a given system will depend on the salinity of the water (sea, brackish, fresh), the temperature of the system, the types of vegetation grown, and other factors. The microorganisms are available from commercial suppliers such as Aquatic Eco-Systems. Commercial products include Bacta-Pur®. The bacteria, for instance, will flow through the entire system or they may imbed themselves in the vegetation substrate, and on the walls and plants in the system. The bacteria and other microorganisms act as effective microfilters in the system.

At the macroorganism level, large species such as marine rotifers, shrimp, snails, worms, crabs and minnows can help control algae growth in the system. One class of macroorganisms include grazing invertebrates such as, for instance, those described in detail in an article entitled "Species-Specific Impacts of Grazing Amphipods in an Eelgrass-bed Community", J. Emmett Duffy, Annie M. Harvilicz, Vol. 223: 201-211, 2001, Marine Ecology Progress Series, Nov. 28, 2001, are introduced directly into the water in the trough prior to placing the planting pots containing the plant seed or seedling into the trough. The details of that article are incorporated herein by reference. Some grazing invertebrates are available from Aquatic Eco-Systems, Inc. (Apopka, Fla.). Larger forms such as glass shrimps, red crabs and various worms are obtained by using a fine mesh net in salt water rivers, streams or bays. Unwanted or invasive species harvested in this way may be removed by the use of Petri dishes, tweezers and a microscope. Grazing invertebrates may be effectively incorporated into a system as described herein in a concentration sufficient to control algae and other related, unwanted growth. The concentration of grazing invertebrates is a function of temperature, rain fall and nutrient levels with these life forms adjusting their own populations in the system accordingly.

Additional system bioorganisms may be added through the addition of live sand or cultured organisms into the trough.

Live sand, for instance, a commercial product called Aragalive, contains biological organisms used to seed the substrate within the trough. This live sand is spread evenly over the area of the trough prior to planting of the subaquatic vegetation. In one example, five pounds of live sand is spread in a trough two weeks prior to planting of the subaquatic vegetation. These bioorganisms provide additional filtration benefits to remove waste products that accumulate in the bottom of the trough as a result of the detritus of the plants and marine grazers.

The present system may include filtration of the water during the cultivation process. By filtering and monitoring the water chemistry as described earlier, it is possible to prevent an imbalance of certain conditions that might otherwise result from artificial nursery conditions. The filtering system acts like the filtration of a natural aquatic system. The filter prevents the closed system from becoming toxic and detrimentally affecting itself.

EXAMPLE

The FIGS. 1-6 demonstrate one example of an operational system as described herein.

Figure 1:
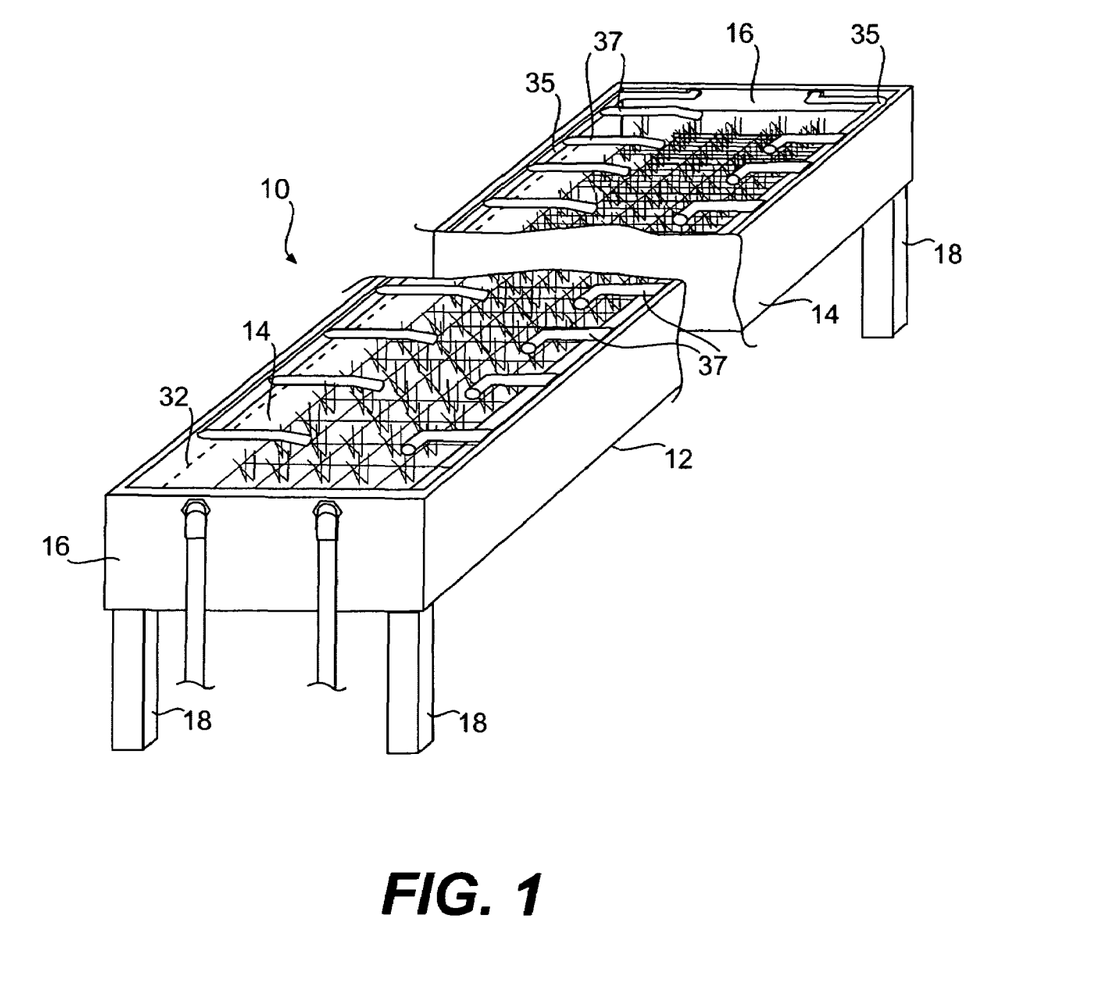
FIG. 1 is a perspective view of a trough in one example of the apparatus described herein.

An exemplary system 10 includes a rectangular trough 12 having two sidewalls 14 and two end walls 16. The trough 12 is elevated on legs 18. The height of each of the sidewalls 14 and end walls 16 is approximately two feet. The dimensions of the trough 12 are approximately 4'×50'.

Figure 2:
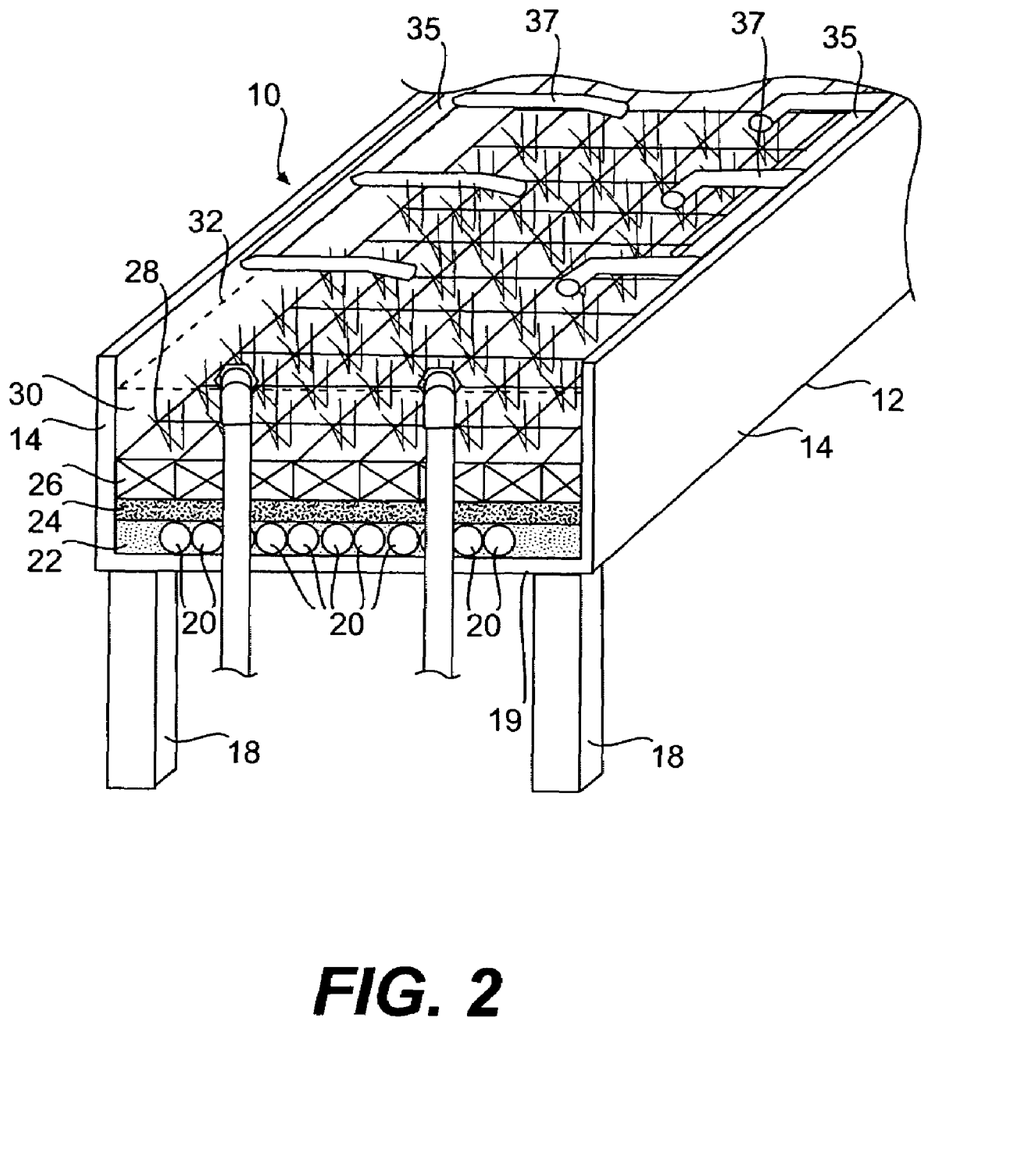
FIG. 2 is a perspective view of the trough shown in FIG. 1 with the end wall removed to show inside layers.

Inside the trough 12, and mounted in the bottom 19 of the trough, there are perforated pipes 20. The perforated pipes 20 are connected to a water feeder pipe and manifold (not shown) to pump water into the trough 12. The pipes 20 are ½" polypropylene pipes and have 3/32" holes spaced apart about every 1-2 feet along their length. A water pump pumps water through these pipes 20, and through the layers of substrate 22, 24 and 26 in the bottom of the trough 12. Surrounding the pipes 20 is approximately three inches of well-pack 22 stone or gravel. The next layer 24 above the well-pack is a sand and/or crushed shell layer. A commercially available product known as Araganite may be used. Above the approximate two inches of Araganite 24 are placed nursery flats containing the actual vegetation substrate 26 in which a plant 28, in this example eel grass, is grown. It has been determined that the Araganite is an effective and versatile growing medium.

Eel grass seeds may be planted under water about one inch below the surface of an Araganite growth medium previously loaded into nursery flats. Eel grass seeds may be obtained by harvesting the seed from plants in bays, rivers and streams. (In Virginia, the seeds are generated by the plants from approximately May 1$^{st}$ to June 15$^{th}$). Alternatively, eel grass seedlings may be planted under water by pouring Araganite growth media around the roots of the seedlings while the seedling is held in each compartment of the plant pot. Eel grass seedlings can be obtained by separating the shoots of eel grass harvested in clumps from existing eel grass beds. The seedlings are washed to remove any foreign matter or organisms before planting. Eel grass seedlings may also be propagated by separating plants previously grown into shoots for replanting.

The water 30 that was added into the trough 12 was fresh water taken from a well. The volume of water was 4500 gallons. Approximately 600 pounds of Pro Line Super Salt Concentrate was added plus about 1000 pounds of NaCl to arrive at a salinity level of about 28 ppt.

A water feeder pipe 35 may further include nozzles 37 that are mounted along the sidewalls 14 of the trough 12 at approximately four foot intervals. (Note that in FIGS. 1 and 2, the nozzles 37 are all above the water level which is an alternative configuration to the nozzle array shown in FIG. 3).

Figure 3:
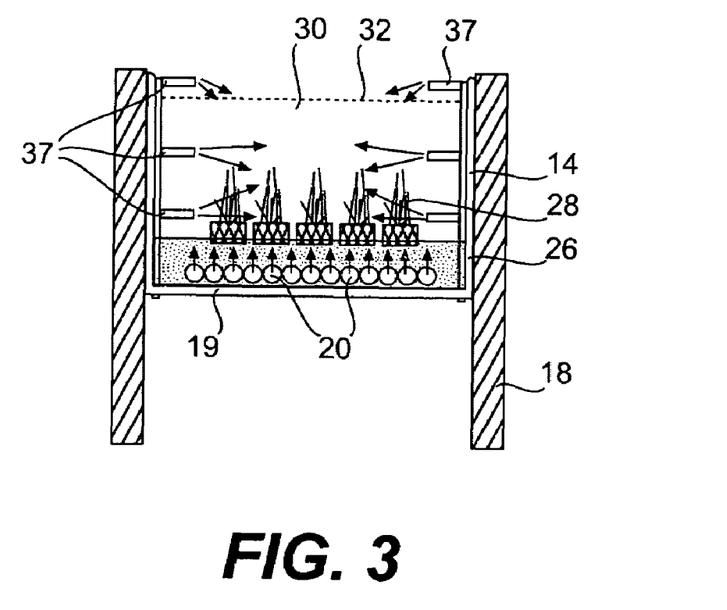
FIG. 3 is a side cross-sectional view of a trough.
Figure 4:
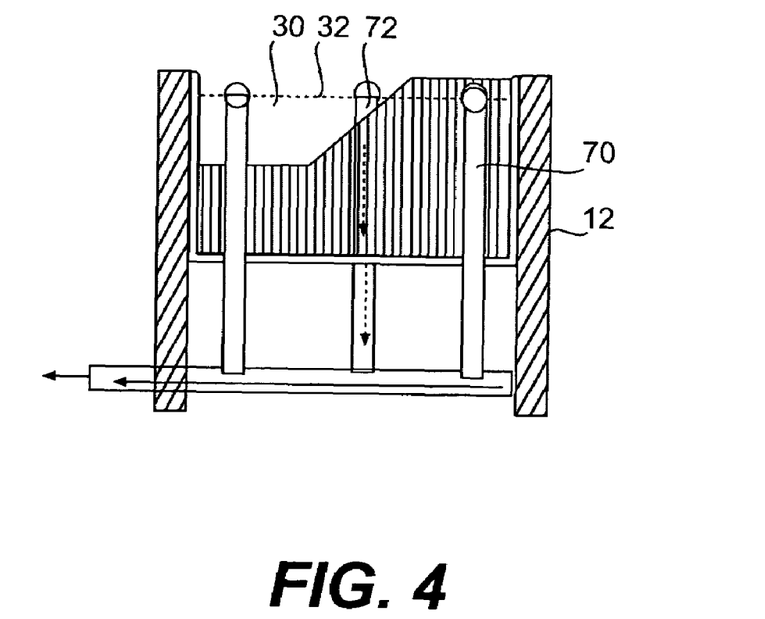
FIG. 4 is another side cross-sectional view of a trough.

Referring now to FIG. 3, additional nozzles 37 are provided and mounted along the depth of the trough such that they may be mounted above the water level 32, approximately at or near the water level, and well-below the water level in the trough. These water nozzles 37 may be connected to the same or different feeder pipes. The amount of the water pumped into these feeder pipes 35 will depend on the velocity of the current or directional flow of water that is determined to be favorable for a particular plant. The pumps used to generate the water flow through the bottom substrate material 22, 24, 26 and through the spray nozzles 37 are rated for about 70 gallons per minute and about 35 gallons per minute, respectively. The actual flow rate is set by the piping restrictions and by setting manual control valves. On/off flow can be accomplished by using a timer or other means to turn the appropriate pump on or off. The switching on and off of the flow can simulate intermittent wave action or tidal flow.

Figure 5:
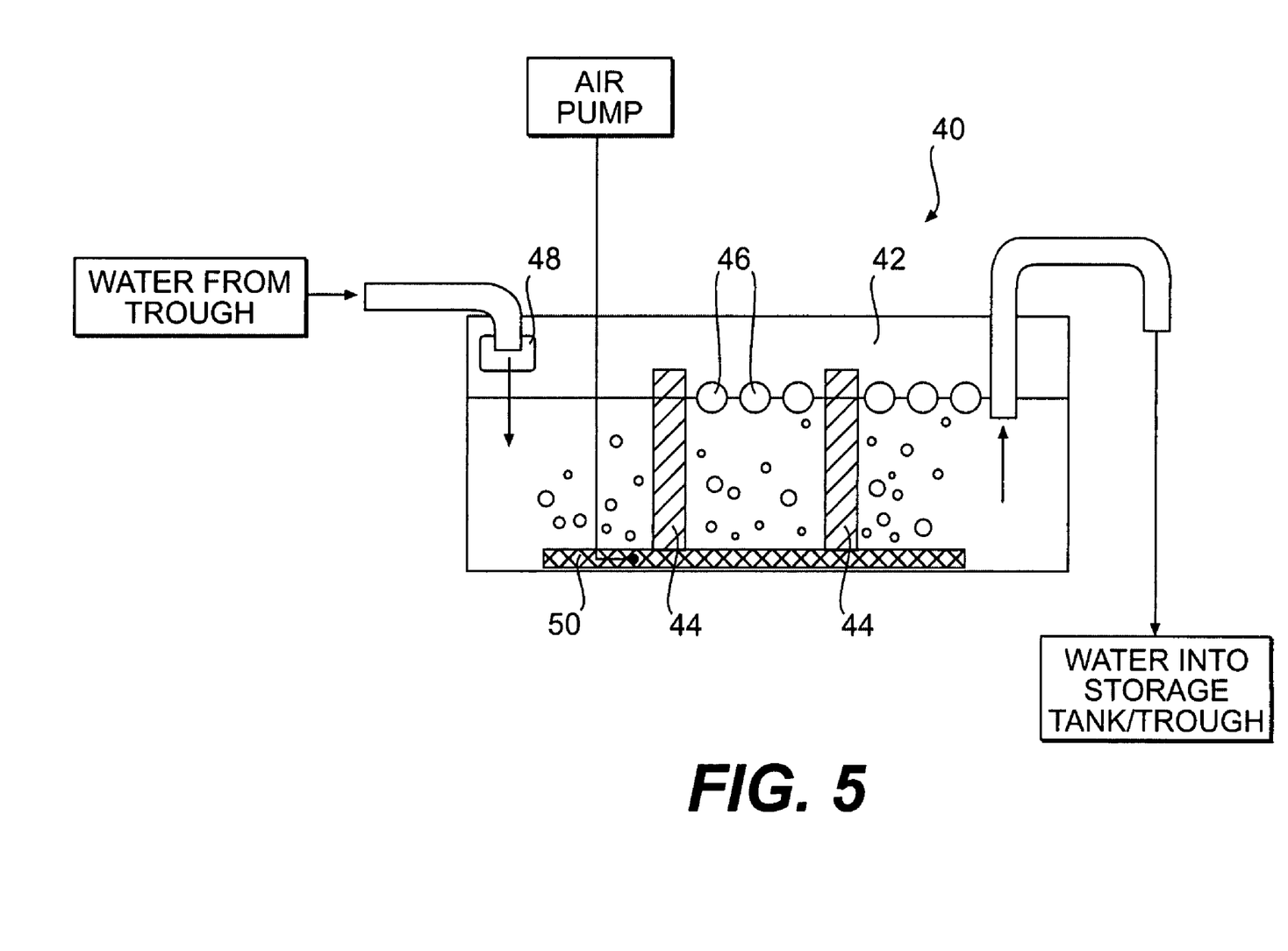
FIG. 5 is a schematic of the filtration system.

In FIG. 5, the water filtration system 40 includes an in-ground tank 42 containing filter stages 44, 46, 48. Overflow water from the trough passes through a filter bag 48 and then through two filter cloth racks 44. Floating filter units 46 referred to as "bioballs" are placed in the tank 42 to enhance the filtration of the overall system. Other commercially available biofilters include Bio Barrels, Bio Strata, Bio-Fill and Siporox® among others The entire filter tank is supplied with dissolved oxygen through a compressed air diffuser system 50 located below each filter stage. The dissolved oxygen increases the effectiveness of the biological community that removes the pollutants and waste products from the overflow water from the trough.

Figure 6:
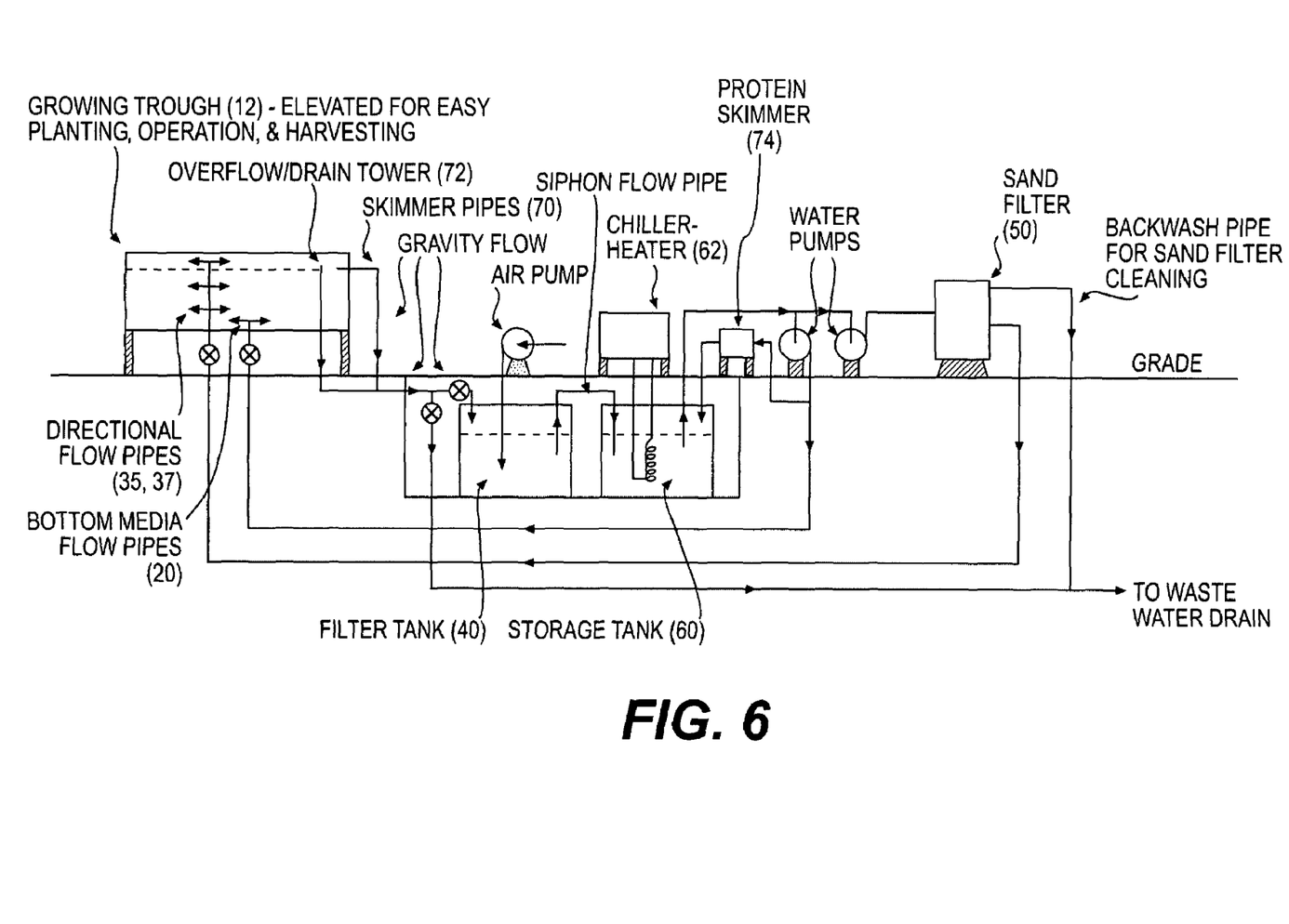
FIG. 6 is a schematic of the operation of an example of an apparatus described herein.

As shown in FIG. 6, an additional underground tank 60 may be used for storage or further filtration. The storage tank 60 (500 gallons) may be effective when changing the water level in the trough 12. The storage tank 60 is also a useful location for a chiller or heater device 62 for regulating the temperature of the water in the growing trough 12.

A pump passes the filtered water from an in ground tank 40 or 60 to a sand filter 50 which physically removes waste products not previously filtered, for instance, dirt. In addition to simply sand, the sand filter 50 may also include other filter materials including, but not limited to, zeolite, activated carbon and aragonite. The filtered water may also be directly diverted to the bottom pipes 20. The output of the sand filter 50 is used by the directional spray nozzles and possibly the bottom flow piping. The in-ground filter tank 40 holds 500 gallons. As also shown schematically in FIG. 6, a protein skimmer 74 may optionally be added in the system with the froth/protein waste diverted to the waste water drain.

As described earlier herein, additional natural bioorganisms, both macroorganisms and microorganisms, are added into the trough. They are commercially available from, for instance, Aquatic Eco-Systems as described earlier.

The water drain pipes include skimmer pipes 70 that are mounted and open inside the trough 12 at approximately the top water level 32 of the water 30 in the trough. There may also and additionally be an overflow/drain tower 72. These pipes 70 and 72 receive water that flows into them as a result of the water being pumped into the trough 12. These pipes 70 and 72 skim off the organic wastes in the top of the water 30 in the trough 12.

FIG. 6 is self-explanatory in describing the interaction of each of the components of an operational system as described herein.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. An apparatus for production of subaquatic vegetation comprising
a containment structure comprising a bottom wall and side wall that are connected together to form a substantially watertight trough;
a directional water flow system mounted on the containment structure comprising a water feeder pipe and a water drain pipe wherein the feeder pipe supplies water into the containment structure and the drain pipe draws water from inside the containment structure, and wherein the water flow system is a closed system;
vegetation growth substrate placed inside the containment structure;
water placed inside the containment structure and having a water level higher than the vegetation growth substrate;
natural bioorganisms placed inside the containment structure; and
a water filtration system connected to the directional water flow system between and connecting the drain pipe and feeder pipe.

2. An apparatus as described in claim 1, wherein the containment comprises a pair of side walls and a pair of end walls, and further wherein the side walls are longer than the end walls so that the containment structure has the shape of a rectangular trough.

3. An apparatus as described in claim 1, wherein the feeder pipe comprises water nozzles and the water nozzles are mounted in the trough and at least one nozzle is below the water level in the trough; and further wherein the nozzles may be swiveled to enable multidirectional water flow.

4. An apparatus as described in claim 1, wherein natural bioorganisms comprise grazing invertebrates.

5. An apparatus as described in claim 4, wherein the grazing invertebrates comprise amphipods.

6. An apparatus as described in claim 1, wherein the water filtration system comprises a plurality of biofiltration components.

7. An apparatus as described in claim 6, wherein the biofiltration components are selected from the group consisting of lava rock, zeolite, activated carbon, well pack, crushed shell, and sand.

8. An apparatus as described in claim 1, wherein the apparatus further comprises bottom substrate flow through pipes that are mounted inside the containment structure and under the top level of the vegetation growth substrate.

9. An apparatus as described in claim 1, wherein the vegetation growth substrate comprises a plurality of cells.

10. A method of producing subaquatic vegetation comprising the steps of providing a containment structure comprising a bottom wall and side walls that are connected together to form a substantially watertight trough;
providing a directional water flow system mounted on the containment structure wherein the water flow system is a closed system;
providing water inside the containment structure, and providing vegetation growth substrate in the containment structure and below the water level;
placing natural bioorganisms inside the containment structure;
creating a directional flow of water across the growth substrate in the containment structure; and
filtering the water provided to the containment structure.

* * * * *